(12) United States Patent
Van Bommel et al.

(10) Patent No.: US 11,143,386 B2
(45) Date of Patent: Oct. 12, 2021

(54) COLLIMATOR DEVICE, A LIGHTING DEVICE, A LAMP AND A LUMINAIRE

(71) Applicant: SIGNIFY HOLDING B.V., Eindhoven (NL)

(72) Inventors: Ties Van Bommel, Eindhoven (NL); Rifat Ata Mustafa Hikmet, Eindhoven (NL)

(73) Assignee: SIGNIFY HOLDING B.V., Eindhoven (NL)

(*) Notice: Subject to any disclaimer, the term of this patent is extended or adjusted under 35 U.S.C. 154(b) by 125 days.

(21) Appl. No.: 16/617,178

(22) PCT Filed: May 23, 2018

(86) PCT No.: PCT/EP2018/063542
§ 371 (c)(1),
(2) Date: Nov. 26, 2019

(87) PCT Pub. No.: WO2018/219745
PCT Pub. Date: Dec. 6, 2018

(65) Prior Publication Data
US 2021/0131643 A1 May 6, 2021

(30) Foreign Application Priority Data
Jun. 1, 2017 (EP) ..................................... 17173889

(51) Int. Cl.
*F21V 13/04* (2006.01)
*F21V 7/00* (2006.01)
(Continued)

(52) U.S. Cl.
CPC .......... *F21V 13/04* (2013.01); *B29D 11/0074* (2013.01); *F21V 7/0091* (2013.01);
(Continued)

(58) Field of Classification Search
CPC .............. B29D 11/0074; G02B 17/006; G02B 19/0019; G02B 19/0047; G02B 27/30;
(Continued)

(56) References Cited

U.S. PATENT DOCUMENTS 3,919,559 A * 11/1975 Stevens .................. G03B 42/02
378/154
4,725,138 A 2/1988 Dillion et al.
(Continued)

FOREIGN PATENT DOCUMENTS

CN 103890288 B 3/2017
CN 105378377 B 6/2017
(Continued)

*Primary Examiner* — Arman B Fallahkhair
(74) *Attorney, Agent, or Firm* — Daniel J. Piotrowski

(57) ABSTRACT

The invention provides a collimator device for a lighting application which comprises a collimator panel having a first end face which receives input light and a second end face which provides collimated light. The second end face is opposite to the first end face. The collimator panel comprises a plurality of walls which extend between the first end face and the second end face to obtain a grid of cells. The cells extend between the first end face and the second end face to obtain the collimated light. At least the plurality of the walls are arranged to obtain cross-sections of the associated cells which form an auxetic structure. The collimator panel is deformable from a first structure into a second structure by changing the cross-section of the associated cells to change the collimated light from a first spatial distribution into collimated light having a second spatial distribution. The first spatial distribution is different from the second spatial distribution.

14 Claims, 5 Drawing Sheets

(51) Int. Cl.
*G02B 19/00* (2006.01)
*G02B 27/30* (2006.01)
*G02B 17/00* (2006.01)
*B29D 11/00* (2006.01)

(52) U.S. Cl.
CPC ....... *G02B 17/006* (2013.01); *G02B 19/0019* (2013.01); *G02B 19/0047* (2013.01); *G02B 27/30* (2013.01); *G02B 2207/123* (2013.01)

(58) Field of Classification Search
CPC .. G02B 2207/123; F21V 13/04; F21V 7/0091
See application file for complete search history.

(56) References Cited

U.S. PATENT DOCUMENTS

| | | | |
|---|---|---|---|
| 5,187,373 A * | 2/1993 | Gregori | G08G 1/087 250/551 |
| 7,033,736 B2 | 4/2006 | Morris et al. | |
| 9,273,850 B2 * | 3/2016 | Onac | F21V 11/06 |
| 10,217,950 B2 * | 2/2019 | Joo | B32B 5/145 |
| 10,266,310 B2 * | 4/2019 | Li | B65D 39/12 |
| 10,953,645 B2 * | 3/2021 | Picaut | B60N 2/686 |
| 2011/0242638 A1 * | 10/2011 | Horning | B82Y 20/00 359/290 |
| 2012/0147351 A1 * | 6/2012 | Jak | G03F 7/70191 355/71 |
| 2014/0160720 A1 | 6/2014 | Seuntiens | |
| 2014/0299408 A1 * | 10/2014 | Swinkels | G10K 11/16 181/289 |
| 2016/0136877 A1 | 5/2016 | Rogers et al. | |

FOREIGN PATENT DOCUMENTS

| | | |
|---|---|---|
| EP | 0531045 A1 | 3/1993 |
| GB | 251040 A | 4/1926 |
| WO | 2017001259 A1 | 1/2017 |

* cited by examiner

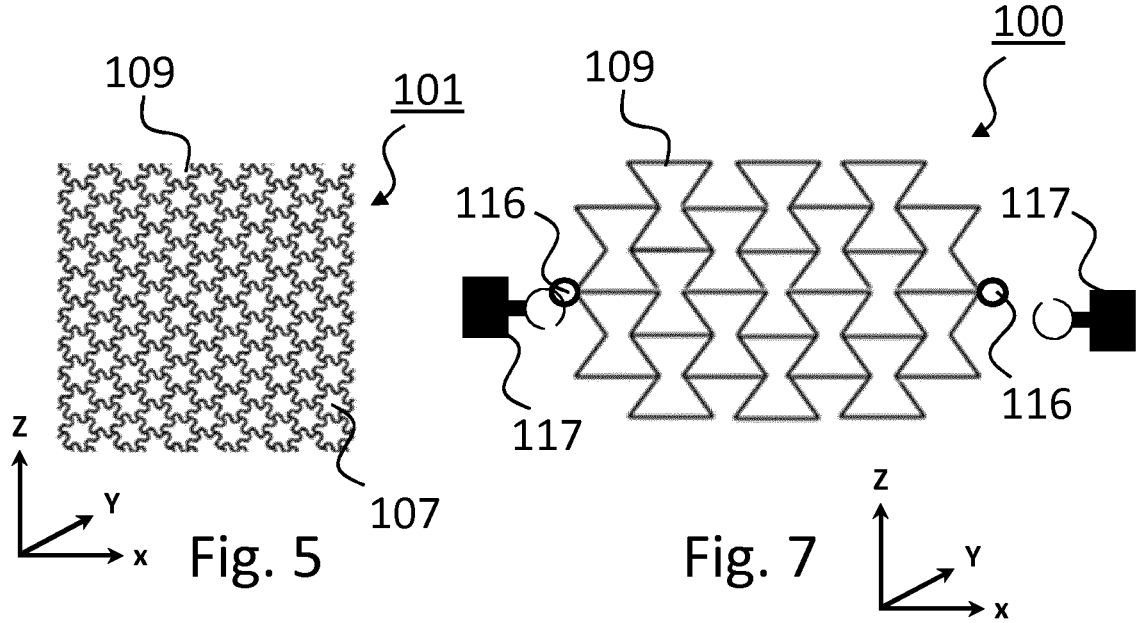
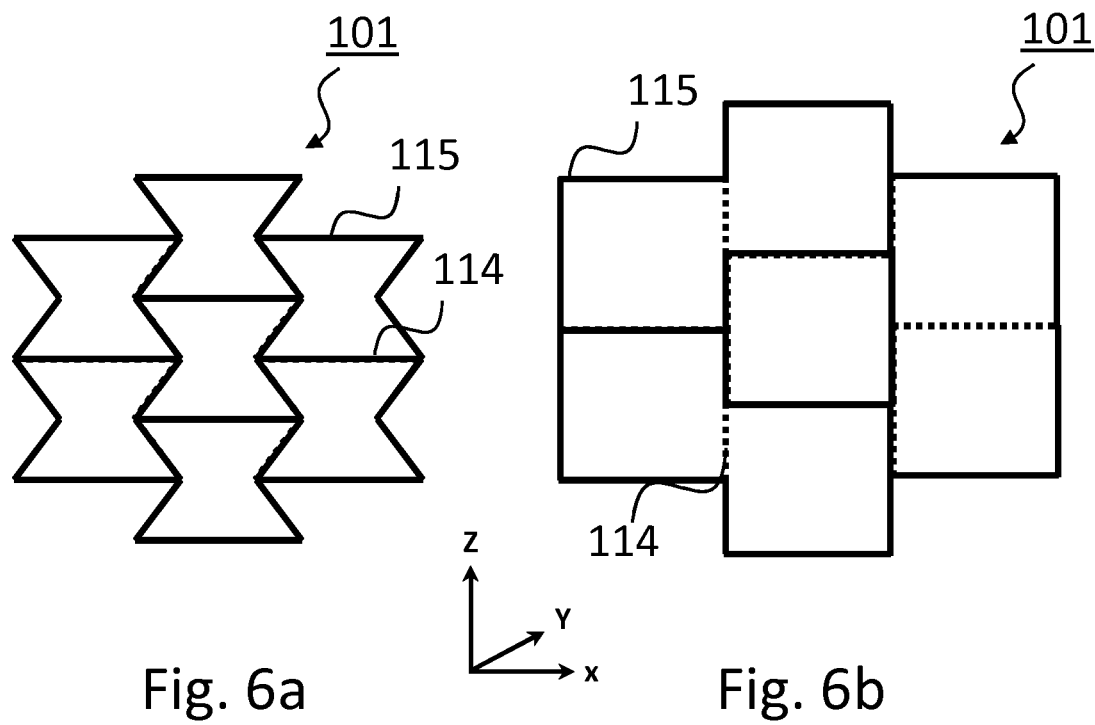

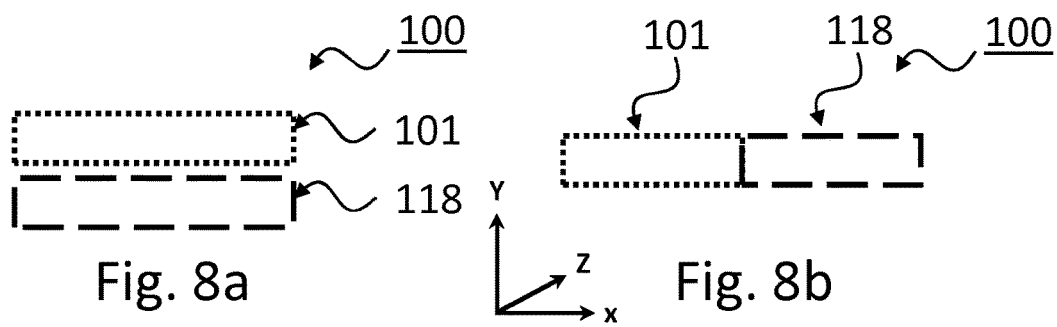
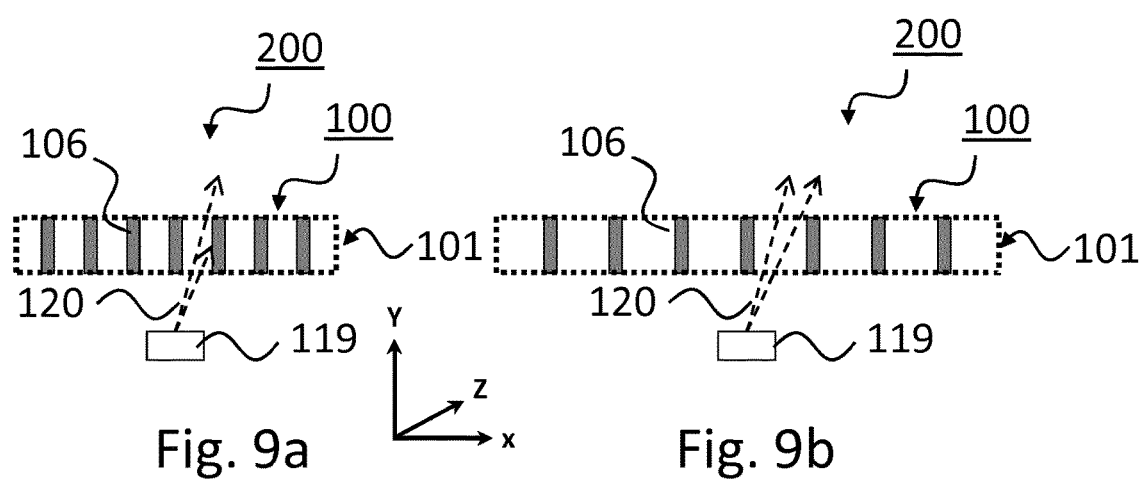
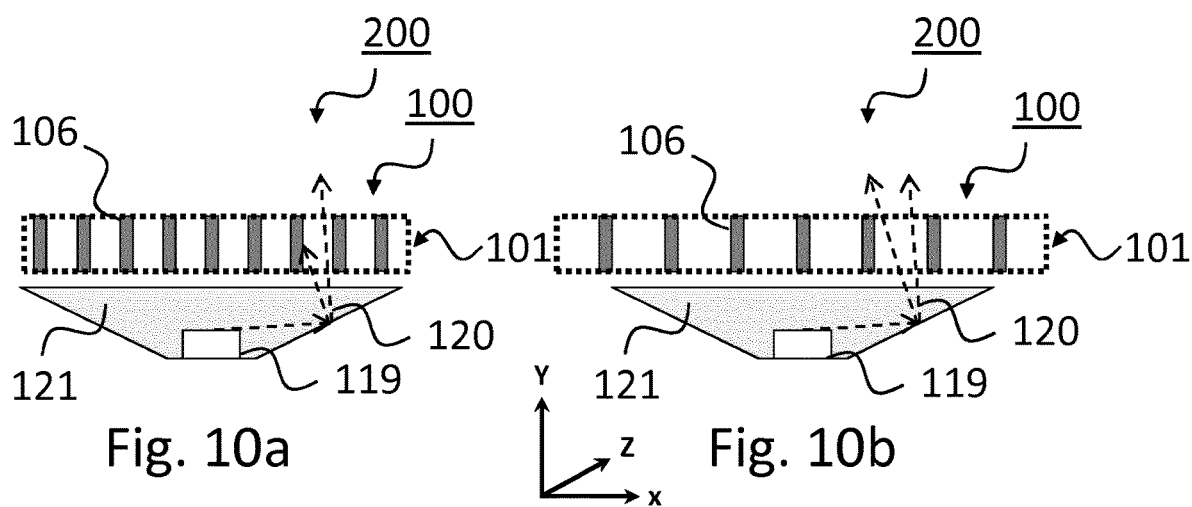

COLLIMATOR DEVICE, A LIGHTING DEVICE, A LAMP AND A LUMINAIRE

CROSS-REFERENCE TO PRIOR APPLICATIONS

This application is the U.S. National Phase application under 35 U.S.C. § 371 of International Application No. PCT/EP2018/063542, filed on May 23, 2018, which claims the benefit of European Patent Application No. 17173889.1, filed on Jun. 1, 2017. These applications are hereby incorporated by reference herein.

FIELD OF THE INVENTION

The present invention relates to a collimator device for use in a lighting application, to a lighting device comprising the collimator device, to a lamp comprising the lighting device, and to a luminaire comprising the lighting device.

BACKGROUND OF THE INVENTION

Collimators are employed in a variety of applications spanning a great many fields of technology. Typically, they are component parts of more complicated pieces of equipment. Broadly defined, a collimator is a device that limits the size and angle of spread of a beam of electromagnetic radiation in some way.

Collimators may be realized in a number of ways. A known collimator for use in collimating visible light is a so-called honeycomb collimator. Such collimator is, for example, disclosed in EP0531045 and composed of hexagonal cells which are separated by walls. Light which impinges on a side of a wall of a cell may be absorbed or redirected for providing collimated light.

However, such known collimator is not well suited for all spatial light distributions and lighting applications.

SUMMARY OF THE INVENTION

It is an object of the present invention to provide a collimator device that produces an improved light collimation.

The present invention discloses a collimator device in accordance with the independent claim 1. Preferred embodiments are defined by the dependent claims.

According to a first aspect of the invention, a collimator device for a lighting application is provided which comprises a collimator panel which has a first end face to receive input light and a second end face to provide collimated light. The second end face is opposite to the first end face. The collimator panel comprises a plurality of walls which extend between the first end face and the second end face to obtain a grid of cells. The cells extend between the first end face and the second end face to obtain the collimated light. At least a plurality of the walls is arranged to obtain cross-sections of the associated cells which form an auxetic structure. The collimator panel is deformable from a first structure into a second structure by changing the cross-section of the associated cells to change the collimated light which has a first spatial distribution into collimated light which has a second spatial distribution. The first spatial distribution is different from the second spatial distribution.

Hence the invention provides a collimator device that is able to produce an improved light collimation. The reason is that instead of a static collimator panel, a deformable collimator panel is used which comprises cells which form an auxetic structure. An auxetic structure has a negative Poisson ratio and the advantage is that it allows to simultaneously increase its length and width (and/or simultaneously decrease its length and width). The deformable collimator panel which comprises cells which form an auxetic structure allows to simultaneously increase the size of the cells in both directions. Thus stretching the deformable collimator panel which comprises cells which form an auxetic structure increases its length, but also increases its width. In this way, one can increase the collimation in both directions simultaneously.

The so-called honeycomb collimator as, for example, disclosed in EP0531045, is unable to produce an improved light collimation as it is not well suited for all spatial light distributions and lighting applications. Even if the cells of the collimator would be deformable, it cannot increase the collimation in both directions simultaneously. The reason is that regular structures, such as honeycomb structures with regular hexagonal cells, have a positive Poisson ratio. Thus stretching normal structures increases its length, but decreases its width.

In an embodiment, the walls may be light absorbing, light reflecting or light diffusing. The side walls may also have a surface structure which can also induce reflection. The obtained effect is improved light collimation. The collimator device is well suited for many spatial light distributions and lighting applications because the light collimation is adjustable in both directions. The reason is that input light which impinges on a side of a wall of a cell may be absorbed or redirected as redirected light. A substantial part of the redirected light and input light which does not impinge on a side of a wall is collimated light. The walls may a diffuse or specular reflective. The reflectivity of the walls is preferably at least 80%. More preferably, the reflectivity of the walls is at least 87%. More preferably, the reflectivity of the walls is at least 90%. The higher the reflectivity of the walls the higher the efficiency of the collimator device. The walls may also be diffuse translucent. For example, the walls may be made of a transparent plastic, such as for example PMMA, PC, PET or any other polymer material, comprising bubbles or scattering particles such as for example Al2O3, BaSO4 and/or TiO2 particles. The walls may be light absorbing. The walls may also be made of metal or metal coated surfaces. The walls may absorb preferably at least 50% of the input light which impinges on the walls. More preferably, the walls may absorb at least 60% of the input light which impinges on the walls. Most preferably, the walls may absorb at least 70% of the input light which impinges on the walls. For example, the walls may absorb 80% of the input light which impinges on the walls. The walls may have a black color. For example, the walls may be made from plastic which comprises a black pigment such as for example carbon black.

In an embodiment, the walls may be arranged at an angle in the range from 60 to 120 degrees to the first end face. More preferably, the walls are arranged at an angle in the range from 75 to 105 degrees to the first end face. Most preferably, the walls are arranged at an angle in the range from 85 to 95 degrees to the first end face. For example, the angles of the walls to the first and face may incline along the diameter of the collimator panel from 85 degrees to 95 degrees such that a symmetrical collimator panel is obtained. The obtained effect is improved efficiency. The reason is that the input light may be a divergent beam of light. The beam divergence of an electromagnetic beam is an angular measure of the increase in beam diameter or radius with distance from the optical aperture from which the electromagnetic beam emerges. If the walls are arranged at an angle in the range from 60 to 120 degrees to the first end face, or at an angle in the range from 75 to 105 degrees to the first end face, or at an angle in the range from 85 to 95 degrees to the first end face, spill light is reduced and light is collimated but still has some divergence.

In an embodiment, the collimator panel may be a symmetrical optical element.

In an embodiment, the walls may be arranged perpendicular to the first end face. The obtained effect is improved light collimation. The reason is that much spill light is reduced or redirected which results in a smaller beam width or beam diameter. The beam width can be expressed in the full width of the beam at half its maximum intensity (FWHM).

In an embodiment, the auxetic structure may have a Poisson ratio in the range from −0.5 to −1.5. The obtained effect is that the collimation can be increased in both directions simultaneously. The reason is that stretching the deformable collimator panel increases its length, but also increases its width.

In an embodiment, the auxetic structure may have a Poisson ratio in the range from −0.8 to −1.1. The obtained effect is that the collimation can be similar increased in both directions simultaneously. The reason is that stretching the deformable collimator panel increases its length, but also increases its width and the aspect ratio length: width is substantially maintained.

In an embodiment, the auxetic structure may be bistable. The obtained effect is that the auxetic structure can be resting in either of two states i.e. the first structure and second structure. The reason is that the auxetic structure may comprise an advanced shape or be made from a material which maintains its shape after stretching. In the context of this application bistable means that the auxetic structure has at least two stable states. For example, the auxetic structure may be made from a metal, such as for example copper or aluminum, which may comprise a coating such as a light absorbing or light diffusing coating. The light absorbing coating may be a black coating such as for example made from carbon black in a polymer binder.

In an embodiment, the auxetic structure is at least ten times deformable from the first structure to the second structure. The obtained effect is that the light collimation properties of the collimator device are maintained after ten deformations. The reason is that the shape and dimensions of the first structure and the shape and dimensions of the second structure are maintained after ten deformations.

In an embodiment, the cells of the auxetic structure have one or more of the following shapes: auxetic hexagonal shape, auxetic square shape, auxetic rectangular shape, and auxetic triangular shape. These auxetic structure shapes are preferred for light collimation applications. The reason is that light in both directions is collimated.

In an embodiment, the auxetic structure comprises at least a first wall of the plurality of the walls which diffuses light and at least a second wall of the plurality of the walls which absorbs light. The obtained effect is improved degrees in designing the collimator device. The reason is that some cells and/or some walls diffuse light, while other cells and/or other walls absorb light. A light absorbing wall provides a higher collimation than a light diffusing wall. A light diffusing wall provides a higher efficiency than a light absorbing wall. Accordingly, the collimator device may be optimized in terms of light collimating performance and efficiency.

In an embodiment, the collimator device further comprises an attachment means which is arranged to attach the collimator device to an object. The obtained effect is improved assembly. The reason is that the collimator device may be easily attached to an object such as for example a luminaire. Examples of attachment means include but are not limited to grommets, loops, buckles, hooks, buttons, screws and lines.

In an embodiment, the collimator device comprises at least the first mentioned collimator panel and a further collimator panel. The obtained effect is improved light collimation. The reason is that the first mentioned collimator panel and the further collimator panel may be serial arranged such that they collimate the same light and thus more light will impinge on the walls of the stacked configuration. The first mentioned collimator panel and the further collimator panel may also be parallel arranged such that the first mentioned collimator panel collimates a first portion of the light and the further collimator panel collimates a second portion of the light. In this way, the collimating properties of the first mentioned collimator panel and the further collimator panel may be optimized for the collimating the first portion of the light and the second portion of the light, respectively. The further collimator panel may be a standard collimator panel i.e. a collimator panel without an auxetic structure.

The present invention discloses a lighting device in accordance with the independent claim 13.

In an embodiment, the lighting device comprises a light source which provides light and the collimator device which is arranged in the optical path of the light source. The obtained effect is improved light collimation of the light source. The reason is that the light source is optically aligned with respect to the collimator device.

In an embodiment, the lighting device comprises a reflector, a lens, a lens array and/or a total internal reflection optical element which is arranged between the light source and the collimator device and which is arranged to pre-collimate the light source light.

The present invention discloses a luminaire or lamp in accordance with the independent claim 15.

In an embodiment, a luminaire or lamp comprises the lighting device.

BRIEF DESCRIPTION OF THE DRAWINGS

Embodiments of the invention will now be described, by way of example only, with reference to the accompanying schematic drawings in which corresponding reference symbols indicate corresponding parts, and in which:

FIG. 5 schematically depicts a cross-section of the collimator panel in a XZ plane according to an embodiment of the present invention;

FIGS. 6*a* and 6*b* schematically depict cross-sections of the collimator panel in a XY plane according to an embodiment of the present invention;

FIG. 7 schematically depicts a cross-section of the collimator device in a XY plane according to an embodiment of the present invention;

FIGS. 8*a* and 8*b* schematically depict cross-sections of a collimator device in a XY plane according to an embodiment of the present invention;

FIGS. 9*a* and 9*b* schematically depict cross-sections of a lighting device in a XY plane according to an embodiment of the present invention;

FIGS. 10*a* and 10*b* schematically depict cross-sections of a lighting device in a XY plane according to an embodiment of the present invention;

The schematic drawings are not necessarily on scale.

The same features having the same function in different figures are referred to the same references.

DETAILED DESCRIPTION OF THE EMBODIMENTS

Figure 1:
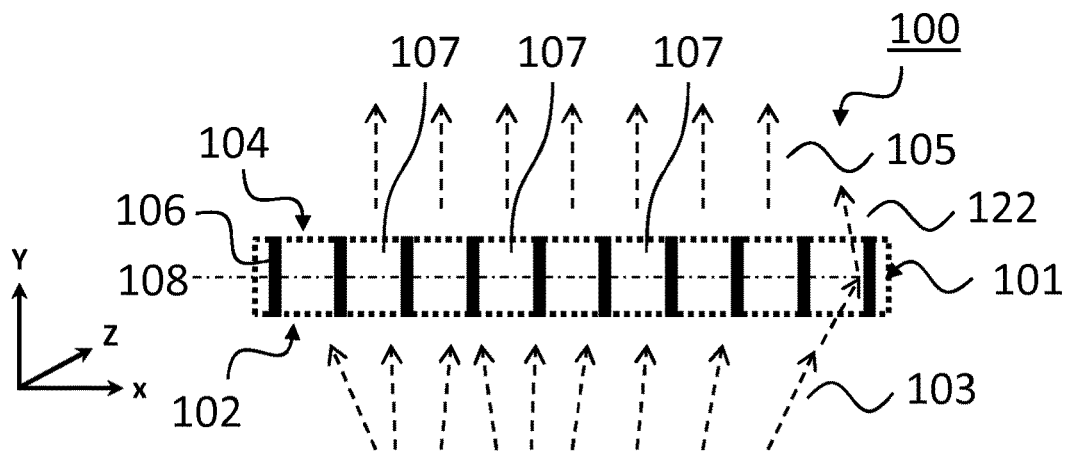
FIG. 1 schematically depicts a cross-section of the collimator device in a XY plane according to an embodiment of the present invention.
Figures 2A, 2B:
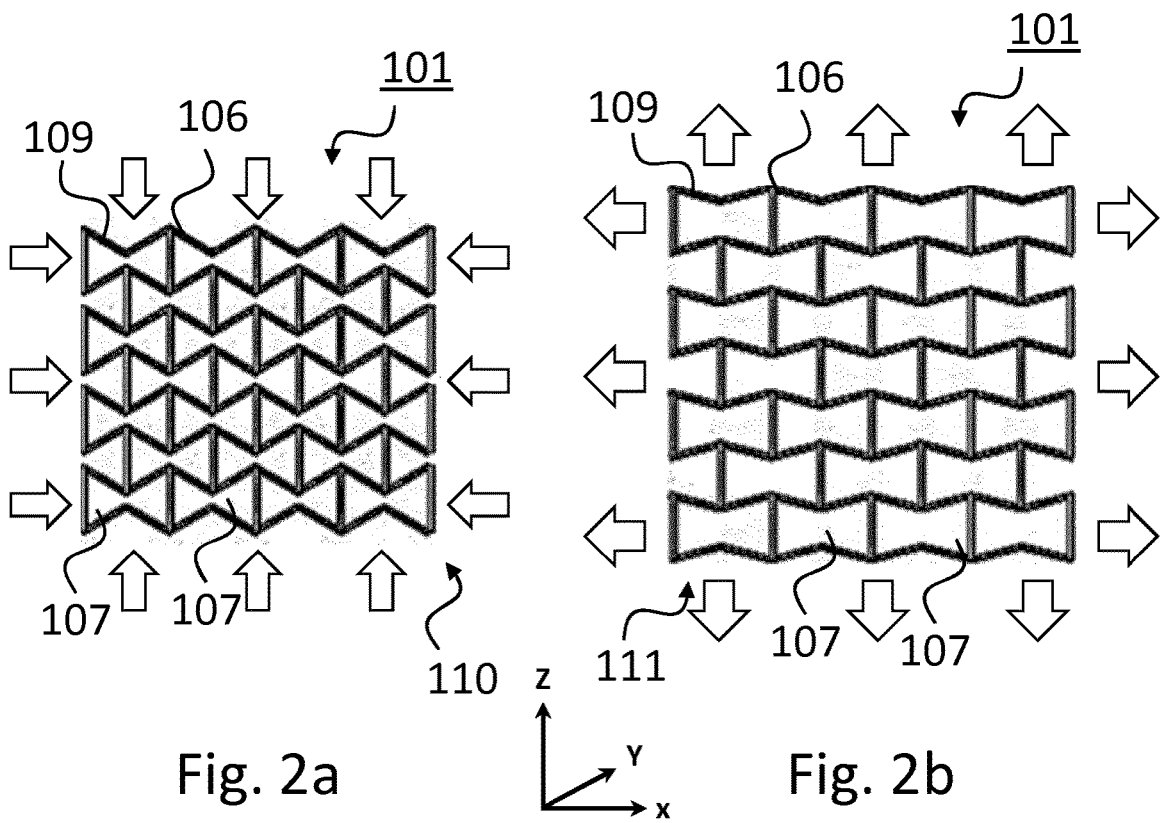
FIGS. 2a and 2b schematically depict cross-sections of the collimator panel in a XZ plane according to an embodiment of the present invention.
Figures 3A, 3B:
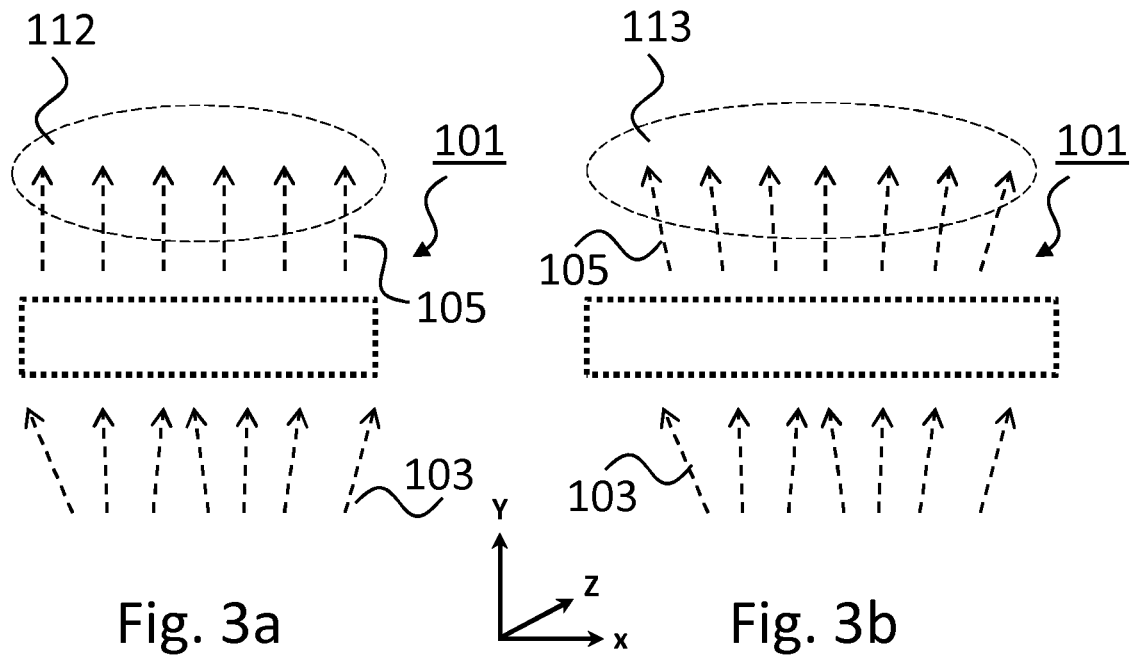
FIGS. 3a and 3b schematically depict cross-sections of the collimator panel in a XY plane according to an embodiment of the present invention.

FIG. 1 schematically depicts a cross-section of the collimator device in a XY plane according to an embodiment of the present invention. FIGS. 2*a* and 2*b* schematically depict cross-sections of the collimator panel in a XZ plane according to an embodiment of the present invention. FIGS. 3*a* and 3*b* schematically depict cross-sections of the collimator panel in a XY plane according to an embodiment of the present invention. As depicted in FIG. 1, the collimator device (100) for a lighting application comprises a collimator panel (101) which has a first end face (102) which receives input light (103) and a second end face (104) which provides collimated light (105). The second end face (104) is opposite to the first end face (102). The collimator panel (101) comprises a plurality of walls (106) which extend between the first end face (102) and the second end face (104) to obtain a grid of cells (107). The cells (107) extend between the first end face (102) and the second end face (104) to obtain the collimated light (105). At least the plurality of the walls (106) are arranged to obtain cross-sections (108) of the associated cells (107) which form an auxetic structure (109), as depicted in FIGS. 2*a* and 2*b*. As depicted in FIGS. 2*a* and 2*b*, the collimator panel (101) is deformable from a first structure (110) into a second structure (111) by changing the cross-sections (108) of the associated cells (107) to change the collimated light (105) which has a first spatial distribution (112) into a collimated light (105) which has a second spatial distribution (113), as depicted in FIGS. 3*a* and 3*b*. As depicted in FIGS. 3*a* and 3*b*, the first spatial distribution (112) is different from the second spatial distribution (113). The first spatial distribution (112) is for example higher collimated than the second spatial distribution (113). A cell (107) may have opposing walls.

The distance between two opposing walls may be preferably in the range from 1 to 30 mm. More preferably, the distance between two opposing walls may be in the range from 2 to 25 mm. Most preferably, the distance between two opposing walls may be in the range from 3 to 20 mm.

The distance between the first end face (102) and the second end face (104) may be preferably in the range from 1 mm to 30 mm. More preferably, the distance between the first end face (102) and the second end face (104) may be in the range from 2 mm to 25 mm. Most preferably, the distance between the first end face (102) and the second end face (104) may be in the range from 3 mm to 20 mm.

As depicted in FIG. 1, the plurality of walls (106) is arranged perpendicular to the first end face (102).

As depicted in FIGS. 2*a* and 2*b*, the auxetic structure (109) may be bistable.

As depicted in FIGS. 2*a* and 2*b*, the auxetic structure (109) may be at least ten times deformable from the first structure (110) to the second structure (111).

The plurality of walls (106) is light absorbing or light diffusing. The input light (103) which impinges on a side of a wall (106) of a cell (107) may be absorbed or redirected as redirected light (122). A substantial part of the redirected light (122) and input light (103) which does not impinge on a side of a wall (106) is collimated light (105). The walls (106) may a diffuse reflective. The reflectivity of the walls (106) is preferably at least 80%. More preferably, the reflectivity of the walls (106) is at least 87%. More preferably, the reflectivity of the walls (106) is at least 90%. The higher the reflectivity of the walls (106) the higher the efficiency of the collimator device (100). The walls (106) may also be diffuse translucent. For example, the walls (106) may be made of a transparent plastic, such as for example PMMA, PC, PET or any other polymer material, comprising bubbles or scattering particles such as for example Al2O3, BaSO4 and/or TiO2 particles. The walls (106) may be light absorbing. The walls (106) may absorb preferably at least 50% of the input light (103) which impinges on the walls (106). More preferably, the walls (106) may absorb at least 60% of the input light (103) which impinges on the walls (106). Most preferably, the walls (106) may absorb at least 70% of the input light (103) which impinges on the walls (106). For example, the walls (106) may absorb 80% of the input light (103) which impinges on the walls (106). The walls (106) may have a black color. For example, the walls (106) may be made from plastic which comprises a black pigment such as for example carbon black.

Figure 4:
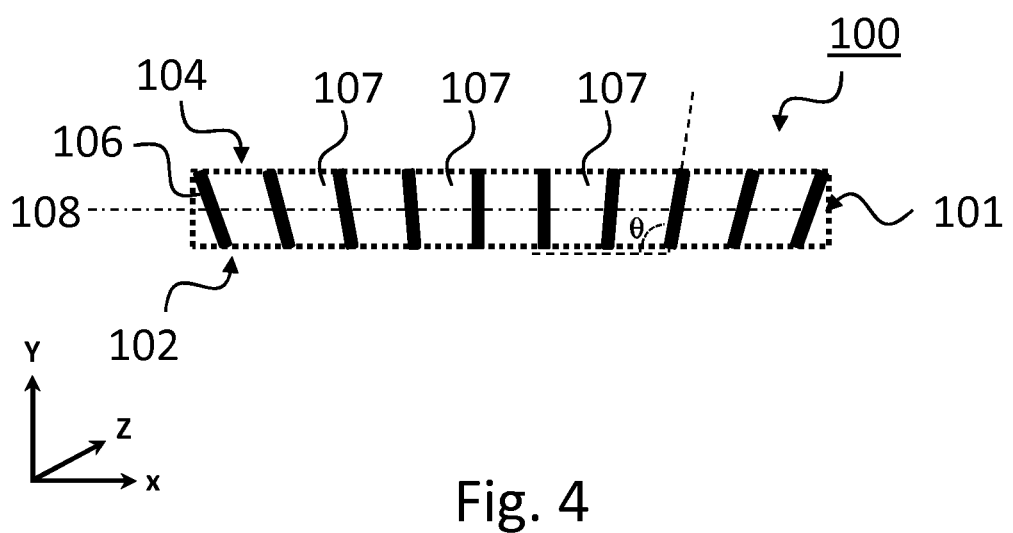
FIG. 4 schematically depicts a cross-section of the collimator device in a XY plane according to an embodiment of the present invention.

FIG. 4 schematically depicts a cross-section of the collimator device in a XY plane according to an embodiment of the present invention. As depicted in FIG. 4, the plurality of walls (106) is arranged at an angle θ in the range from 60 to 120 degrees to the first end face (102).

FIG. 5 schematically depicts a cross-section of the collimator panel in a XZ plane according to an embodiment of the present invention. As depicted in FIG. 5, the cells (107) of the auxetic structure (109) have one or more of the following shapes: auxetic hexagonal shape, auxetic square shape, auxetic rectangular shape, and auxetic triangular shape.

As depicted in FIG. 5, the auxetic structure (109) may have a Poisson ratio in the range from −0.5 to −1.5.

As depicted in FIG. 5, the auxetic structure (109) may have a Poisson ratio in the range from −0.8 to −1.1.

FIGS. 6*a* and 6*b* schematically depict cross-sections of the collimator panel in a XY plane according to an embodiment of the present invention. As depicted in FIGS. 6*a* and 6*b*, the auxetic structure (109) comprises at least a first wall (114) of the plurality of the walls (106) which is light diffusing and at least a second wall (115) of the plurality of the walls (106) which is light absorbing.

FIG. 7 schematically depicts a cross-section of the collimator device in a XY plane according to an embodiment of the present invention. As depicted in FIG. 7, the collimator device (100) further comprises an attachment means (116) arranged to attach the collimator device (100) to an object (117).

FIGS. 8a and 8b schematically depict cross-sections of a collimator device in a XY plane according to an embodiment of the present invention. As depicted in FIG. 8a, the collimator device (100) comprises at least the first mentioned collimator panel (101) and a further collimator panel (118) which are stacked on top of each other and collimate both the same input light (103). As depicted in FIG. 8b, the collimator device (100) comprises at least the first mentioned collimator panel (101) and a further collimator panel (118) which are arranged in the same plane and collimate both a different part of the input light (103).

FIGS. 9a and 9b schematically depict cross-sections of a lighting device in a XY plane according to an embodiment of the present invention. As depicted in FIGS. 9a and 9b, the lighting device (200) comprises a light source (119) which provides light source light (120) and the collimator device (100) which is arranged in the optical path of the light source (119). The collimator panel (101) is deformable from a first structure (110) into a second structure (111) by changing the cross-sections (108) of the associated cells (107) to change the collimated light (105) having a first spatial distribution (112) into a collimated light (105) having a second spatial distribution (113), wherein the first spatial distribution (112) is different from the second spatial distribution (113).

FIGS. 10a and 10b schematically depict cross-sections of a lighting device in a XY plane according to an embodiment of the present invention. As depicted in FIGS. 10a and 10b, the lighting device (200) comprises an optical element (121) selected from the group of a reflector, a lens, a lens array and/or a total internal reflection optical element. The optical element (121) is arranged between the light source (119) and the collimator device (100) and is arranged to pre-collimate the light source light (120).

Figure 11:
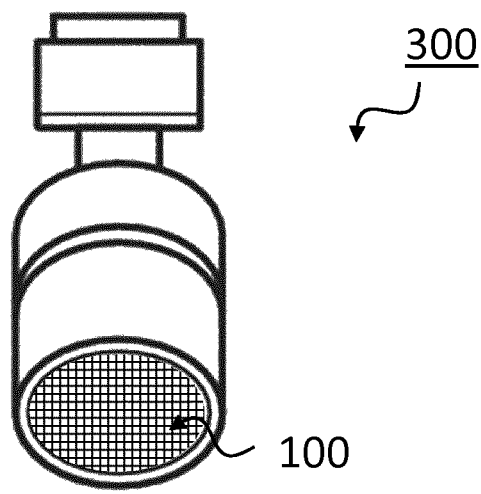
FIG. 11 schematically depicts a side view of the luminaire according to an embodiment of the present invention.

FIG. 11 schematically depicts a side view of the luminaire (300). As depicted in FIG. 11, the luminaire (300) comprises the collimator device (100).

Figure 12:
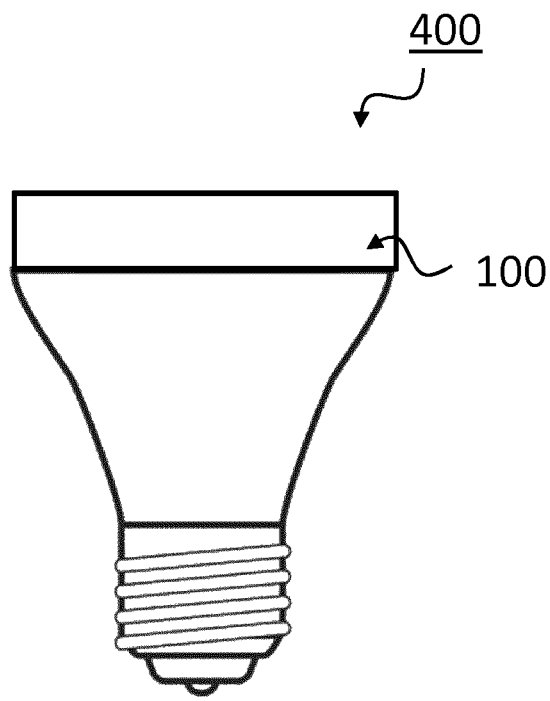
FIG. 12 schematically depicts a side view of the lamp according to an embodiment of the present invention.

FIG. 12 schematically depicts a side view of the lamp (400). As depicted in FIG. 12, the lamp (400) comprises the collimator device (100).

The lighting device 200 may be configured to provide white light. The term white light herein, is known to the person skilled in the art and relates to white light having a correlated color temperature (CCT) between about 2.000 K and 20.000 K. In an embodiment the CCT is between 2.500 K and 10.000K. Usually, for general lighting, the CCT is in the range of about 2700K to 6500K. Preferably, it relates to white light having a color point within about 15, 10 or 5 SDCM (standard deviation of color matching) from the BBL (black body locus). Preferably, it relates to white light having a color rendering index (CRI) of at least 70 to 75, for general lighting at least 80 to 85.

The term "substantially" herein, such as in "substantially all light" or in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of". The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention further applies to a device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A lighting device comprising a light source for providing light source light and a collimator device, and being arranged in the optical path of the light source light; the collimator device comprising:
   a collimator panel having a first end face for receiving input light and a second end face for providing collimated light, wherein the second end face is opposite to the first end face,
   the collimator panel comprising a plurality of walls extending between the first end face and the second end face for obtaining a grid of cells, the cells extending between the first end face and the second end face for obtaining the collimated light, at least the plurality of the walls being arranged for obtaining cross-sections of the associated cells forming an auxetic structure, and
   wherein the collimator panel is deformable from a first structure into a second structure and back by changing the cross-sections of the associated cells to change the collimated light having a first spatial distribution into collimated light having a second spatial distribution, wherein the first spatial distribution is different from the second spatial distribution.

2. The lighting device according to claim 1, wherein the plurality of walls are light absorbing, light reflecting or light diffusing.

3. The lighting device according to claim 1, wherein the plurality of walls are arranged at an angle in the range from 60 to 120 degrees to the first end face.

4. The lighting device according to claim 1, wherein the plurality of walls are arranged perpendicular to the first end face.

5. The lighting device according to claim 1, wherein the auxetic structure having a Poisson ratio in the range from −0.5 to −1.5.

6. The lighting device according to claim 1, wherein the auxetic structure having a Poisson ratio in the range from −0.8 to −1.1.

7. The lighting device according to claim 1, wherein the auxetic structure is bistable.

8. The lighting device according to claim 1, wherein the auxetic structure is at least ten times deformable from the first structure to the second structure.

9. The lighting device according to claim 1, wherein the cells of the auxetic structure have one or more of the following shapes: auxetic hexagonal shape, auxetic square shape, auxetic rectangular shape, and auxetic triangular shape.

10. The lighting device according to claim 1, wherein the auxetic structure comprising at least a first wall of the plurality of the walls being light diffusing and at least a second wall of the plurality of the walls being light absorbing.

11. The lighting device according to claim 1, further comprising attachment means arranged for attaching the collimator device to an object.

12. The lighting device according to claim 1, comprising at least the collimator panel and a further collimator panel.

13. The lighting device according to claim 1, comprising an optical element selected from the group of a reflector, a lens, a lens array and/or a total internal reflection optical element and being arranged between the light source and the collimator device.

14. A luminaire or lamp comprising the lighting device as claimed in claim 1.

* * * * *